United States Patent
Tsukahara et al.

[11] Patent Number: 5,708,881
[45] Date of Patent: Jan. 13, 1998

[54] CAMERA DISPLAY DEVICE WITH REDUCED DISPLAY TIME

[75] Inventors: Daiki Tsukahara, Hiratsuka; Tadashi Ohtani, Ohtawara, both of Japan

[73] Assignee: Nikon Corporation, Tokyo, Japan

[21] Appl. No.: 343,977

[22] Filed: Nov. 18, 1994

[30] Foreign Application Priority Data

Dec. 1, 1993 [JP] Japan .................. 5-300727

[51] Int. Cl.$^6$ ..................... G03B 17/18
[52] U.S. Cl. .............. 396/281; 396/147; 396/282; 396/294
[58] Field of Search .................. 354/469, 470, 354/289.1, 289.12, 409, 471, 475, 465, 468, 195.13, 127.13; 396/147, 281, 282, 294

[56] References Cited

U.S. PATENT DOCUMENTS

| | | | |
|---|---|---|---|
| 4,181,419 | 1/1980 | Schlapp et al. | 354/286 |
| 4,281,917 | 8/1981 | Kitigawa et al. | 354/289 |
| 4,771,312 | 9/1988 | Yanase et al. | 355/3 |
| 4,811,043 | 3/1989 | Ishimura et al. | 354/412 |
| 5,060,007 | 10/1991 | Egawa | 354/430 |
| 5,365,292 | 11/1994 | Wakabayashi et al. | 354/289.1 |

FOREIGN PATENT DOCUMENTS 63-162337  10/1988  Japan.

*Primary Examiner*—Safet Metjahic
*Assistant Examiner*—Daniel P. Malley

[57] ABSTRACT

A needle-type display device for displaying photographic data in a camera, the display device including a display having indicating needles which move directly from displaying presently displayed values to displaying new values without temporarily returning to an origin position. The display device includes a half-press switch having first and second positions, and a rangefinder and photometric unit which operate when the half-press switch is in the first position. The display displays photographic data measured by the range finder and photometric unit according to an amount of movement from an origin position by the respective indicating needles. When the half-press switch switches to the second position, a hold command unit operates to hold the respective indicating needles for a predetermined period of time at the display position displaying the measured amount. When a new measurement is performed by the rangefinder or photometric unit during the hold period, an update command unit moves the indicating needles directly from their present positions to new positions without returning to their origins. By the indicating needles moving directly to new display positions, the time required for the display needles to move is reduced, and a quick display response to measured photographic data is possible.

14 Claims, 6 Drawing Sheets

CAMERA DISPLAY DEVICE WITH REDUCED DISPLAY TIME

BACKGROUND OF THE INVENTION

1. Field of the Invention

The present invention relates to a camera display device which displays photographic data such as a subject distance and an aperture value, and more particularly to an analog type display device having pointer needles and requiring reduced time for the pointer needles to move to a required display position allowing display in a shorter period of time.

2. Description of the Related Art

Devices for displaying photographic data are known. Conventional devices which display measured values of photographic data, such as a subject distance and aperture value operate as follows. First, a switch (normally a half-press switch) is turned ON starting the measurement of photographic data by a measuring device. At the same time that the measuring device performs measurement of the photographic data, display indicating needles start to move from respective origin positions to positions at which the measured values are displayed. Next, when the half-press switch is turned OFF, the indicating needles return to their origins after holding for a predetermined period of time at the positions they were in immediately before the half-press switch was turned OFF. However, when the half-press switch is turned ON again before the fixed hold period has elapsed, new measurements are performed, and the indicating needles move to new display positions after returning to the origins.

As described above, the indicating needles in the conventional type of display device move to new display positions after returning to their respective origins when the half-press switch is turned ON again during the hold period after the half-press switch was turned OFF. As a result of the above-described type of movement of the indicating needles, a quick response is impossible, and the display is difficult to read because the needles oscillate greatly.

SUMMARY OF THE INVENTION

It is an object of the present invention to provide a display device with a display which is easy to read.

It is another object of the present invention to provide a display device including indicating needles which have a quick response when displaying measured values.

It is a further object of the present invention to provide a display device including indicating needles for displaying measured values when a half-press switch is turned ON, wherein the indicating needles do not return to origin positions when the half-press switch is turned ON and new measurements are performed during a hold period after the half-press switch was turned OFF, but move directly to new display positions to display the new measurements.

Other objects and advantages of the invention will be set forth in the description which follows, and, in part, will be obvious from the description, or may be learned by practice of the invention.

Objects of the invention are attained in accordance with the present invention by providing a display device including a measuring device to measure data and a display including an indicating needle and a display scale, wherein the indicating needle points to the display scale to display data measured by the measuring device A control unit controls the indicating needle to move directly from a present display position to a new display position when a new measurement of data is performed when the indicating needle is at the present display position.

As embodied herein, the display device includes a switch having a first position and a second position, and a photographic data measuring device operating to measure photographic data when the switch is at the first position. A display displays the data measured by the measuring device according to an mount by which indicating needles move from their respective origin positions. A hold command unit operates when the switch is at the second position and holds the indicating needles for a predetermined period of time at display positions corresponding to the photographic data measured by the measuring device, then returns the indicating needles to their respective origins. An update command unit moves the indicating needles directly from their present positions to new positions when new measurements of photographic data are performed by the measuring device during the hold period.

The switch may be a half-press switch which actuates the photographic data measuring device when the half-press switch is turned ON. The photographic data measuring device may include a rangefinder and a photometric device, which perform measurement of subject distance and subject brightness, respectively, or the measuring device may include other devices for measuring photographic data. Measured values are displayed as an amount of movement of indicating needles from their respective origins. When the half-press switch is turned OFF, the hold command unit is actuated, and the indicating needles hold, for a predetermined period of time, the measured values pointed to immediately before the half-press switch was switched OFF. If the half-press switch is turned ON again during the hold period, new measurements are performed and, at this time, the update command unit causes the indicating needles to rotate directly to the positions of the new measured values without returning to the respective origins.

BRIEF DESCRIPTION OF THE DRAWINGS

These and other objects and advantages of the present invention will become apparent and more readily appreciated from the following description of the preferred embodiments taken in conjunction with the accompanying drawings, of which.

DESCRIPTION OF THE PREFERRED EMBODIMENTS

Figure 1:
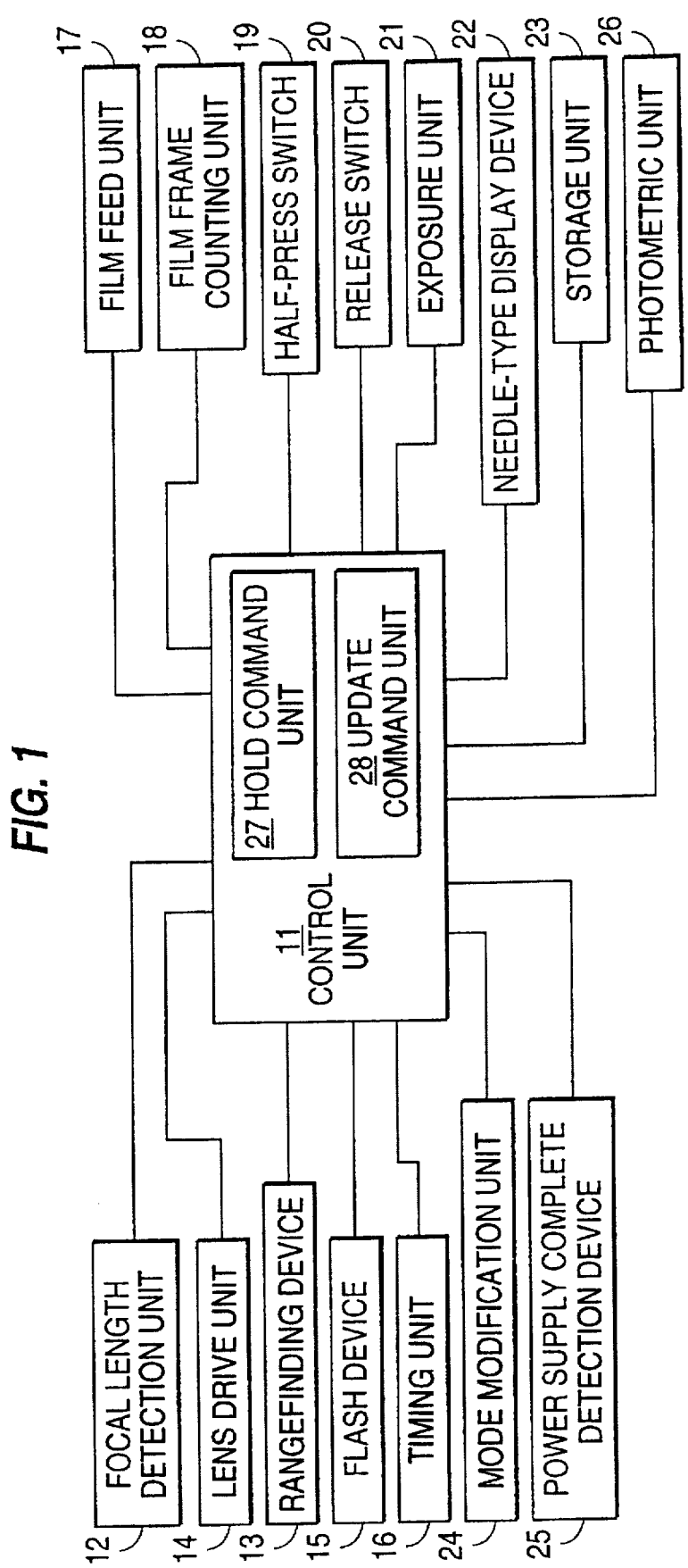
FIG. 1 is a block diagram of a control system for a camera having a display in accordance with a preferred embodiment of the present invention.

Reference will now be made in detail to the preferred embodiments of the present invention, examples of which are illustrated in the accompanying drawings, wherein like reference numerals refer to the same or similar elements throughout.

A preferred embodiment of the present invention will be described below with reference to FIGS. 1 through 7. As shown in FIG. 1, a control unit 11 performs drive control of a needle-type display device 22 while performing sequence control and various computations for a camera 10 (shown in FIG. 2). The control unit 11 may include a microcomputer and its peripheral components, a CPU or other hardwired control circuitry capable of performing the control functions described herein. As will be described in more detail below with respect to FIGS. 6 and 7, the control unit 11 includes a hold command unit 27 which holds indicating needles of the needle-type display device 22 for a predetermined period of time at positions which display measured values of photographic data, and after holding the indicating needles for the predetermined period of time, returns the indicating needles to their respective origins. The control unit 11 also includes an update command unit 28 which moves the indicating needles directly from current positions to new positions corresponding to values of photographic data measured during the hold period.

Various circuitry and devices for performing camera operations are connected to the control unit 11, including a focal length detection unit 12, which detects a focal length of a picture-taking lens (not shown); a rangefinding device 13 for measuring a subject distance; a lens drive unit 14 which drives the picture-taking lens in response to command signals from the control unit 11; a photometric unit 26 for measuring subject brightness; a flash device 15 which illuminates the subject in response to command signals from the control unit 11; a timing unit 16 which outputs data related to the date and time; a mode modification unit 24, which includes a push-switch group (not shown) and rotating dials for changing the camera mode; a power supply complete detection device 25 which detects whether or not there are power batteries by opening and closing the camera's battery cover (not shown); a film feed unit 17 which feeds and rewinds the film; a film-frame counting unit 18 which outputs one count signal per frame of film fed; a half-press switch 19 which includes first position and second position contact points, where the switch 19 is placed in the first position (an ON position) when a release button 1 (FIG. 2) is pressed halfway, and the switch 19 is placed in the second position (an OFF position) when the release button 1 is released; a release switch 20 which is ON when the release button 1 is fully pressed, causing exposure to begin; an exposure unit 21 which drives an aperture (not shown) and shutter (not shown) of the camera to expose the film; a needle-type display device 22 which is located on the upper surface of the camera 10 and which displays photographic data; and a storage unit 23 which temporarily stores the positions of the indicating needles and which stores specified constants.

In accordance with the preferred embodiment of the invention, the photographic data measured by the rangefinding device 13 and photometric unit 26 are displayed by the needle-type display device 22. However, the type of data displayed is not limited to that measured by the rangefinding device 13 and photometric unit 26, and other types of data measured by other types of measuring devices may be displayed in accordance with embodiments of the display device of the present invention.

Figure 2:
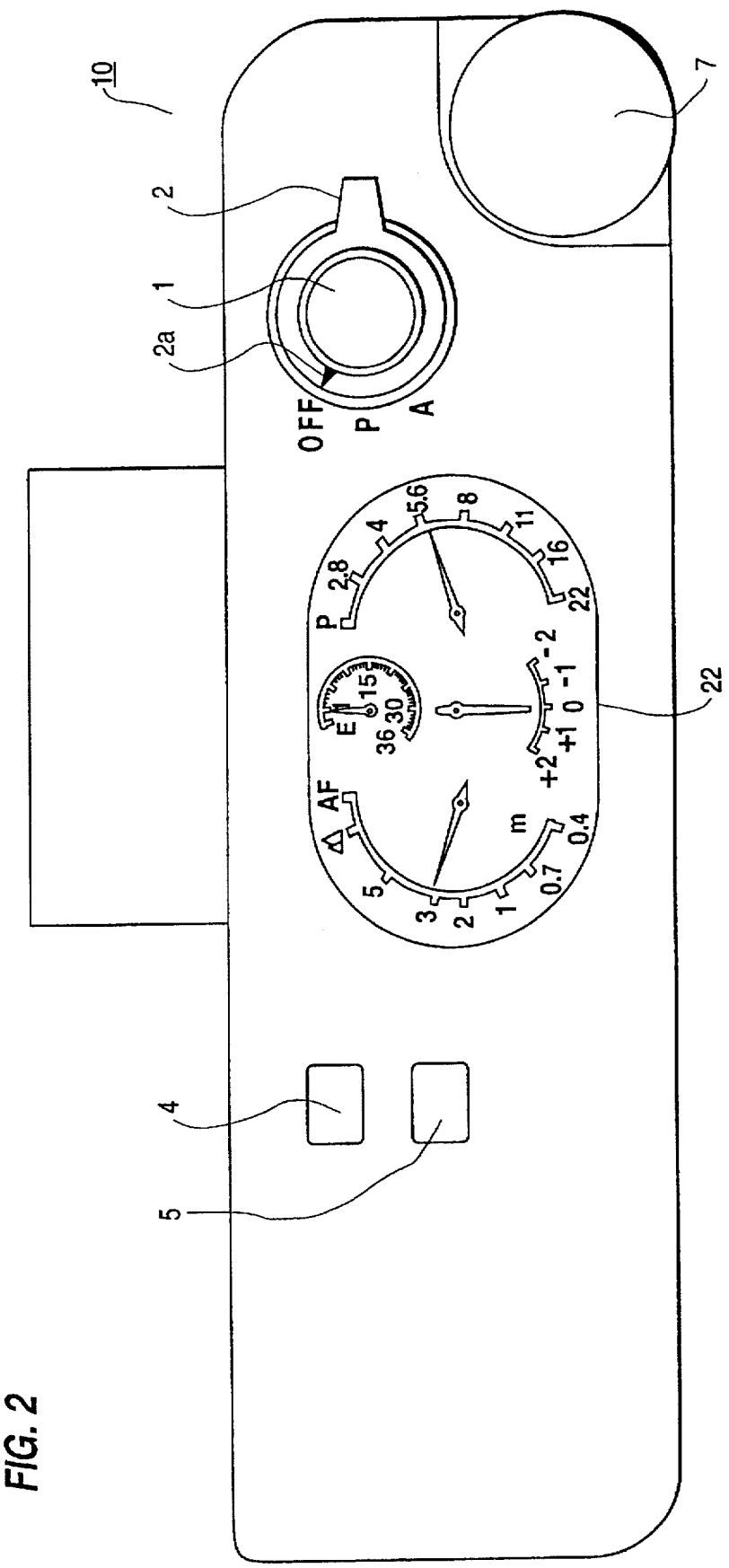
FIG. 2 is a top-view of a camera having a display in accordance with the preferred embodiment of the present invention.

FIG. 2 is a top view of the camera 10 having a display device 22 in accordance with the preferred embodiment of the present invention. The release button 1, a picture-taking mode selection lever 2, a display 3 (which is part of the needle-type display device 22), a manual focus mode button 4, an exposure compensation button 5, and a command dial 7 are positioned on top of the camera 10. The picture-taking mode selection lever 2 includes an indicator 2a which may be set to various picture-taking modes. When the indicator 2a is set to "P", a program mode is set, and an aperture value and a shutter speed value are automatically determined according to the subject brightness by a program which has been set in advance. When the indicator 2a is set to "A", an aperture priority mode is set, and the command dial 7 may be used to set a desired aperture value. When the indicator 2a is set to OFF, camera operation stops. The command dial 7 is rotatable to set various photographic values. When the command dial 7 is rotated while pressing the manual focus mode button 4, a desired range value is set. When the command dial 7 is rotated while pressing the exposure compensation button 5, a desired exposure compensation value is set. Further, in aperture priority mode A, when the command dial 7 is rotated, an indicating needle 34c (FIG. 3) is rotated according to the direction and amount of rotation of the command dial 7, and the desired aperture value is set.

Figure 3:
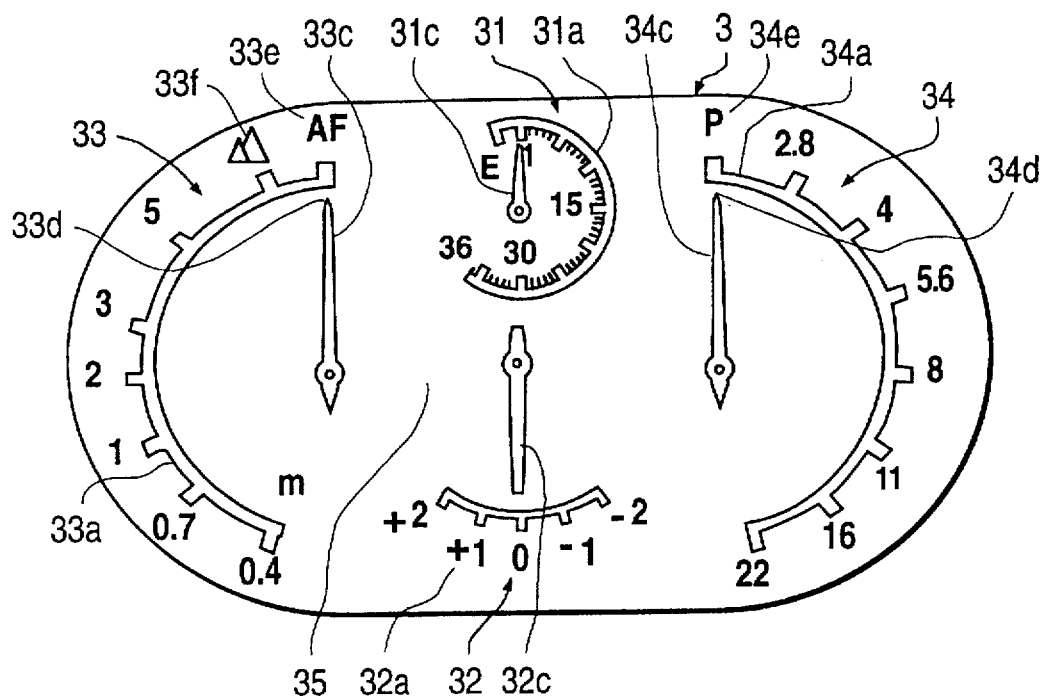
FIG. 3 is an enlarged top-view of the display shown in FIG. 2.

FIG. 3 is an enlarged top view of the display 3 shown in FIG. 2. The display 3 includes a frame count display 31, an exposure compensation display 32, a range display 33, and an aperture display 34. The frame count display 31 displays a frame count with an indicating needle 31c which rotates about a frame count scale 31a. The exposure compensation display 32 displays an exposure compensation value with an indicating needle 32c which rotates above a compensation value scale 32a. The range display 33 indicates a distance to the subject, and includes a range scale 33a in meters, which is pointed to by an indicating needle 33c. Points on the range scale 33a are indicated by pointer end 33d on one side of the indicating needle 33c. An "AF" symbol 33e on the range scale 33a indicates the origin of the indicating needle 33c during autofocus mode. The indicating needle 33c is initially at the AF position until the half-press switch 19 is turned ON. The symbol labeled 33f on the range scale 33a signifies infinity. The aperture display 34 includes a scale 34a which displays the aperture value and is pointed to by an indicating needle 34c. Points on the aperture scale 34a are indicated by pointer end 34d on one side of the indicating needle 34c. The "P" symbol 34e on scale 34a indicates the origin of indicating needle 34c during program mode, and the indicating needle 34c is initially at the P position on scale 34a until the half-press switch 19 is turned ON. The scales 31a, 32a, 33a, 34a of the four displays 31, 32, 33, 34, respectively, are formed on a common scale plate 35.

Figure 4:
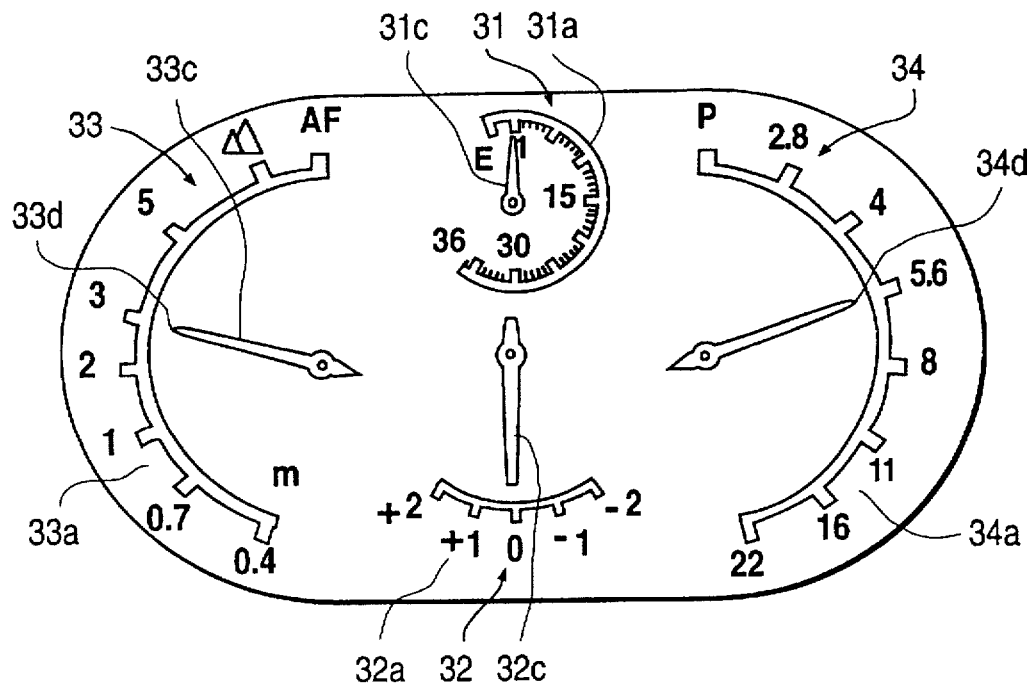
FIG. 4 is an enlarged top-view of the display shown in FIG. 2 displaying measured values during operation.

FIG. 4 is an enlarged top-view showing an example of the display 3 during operation. On the frame count display 31, indicating needle 31c is rotated about the frame count display 31 by a stepping motor (not shown) with each picture taken, and the present frame count is indicated on scale 31a. When the command dial 7 is rotated while pressing the exposure compensation button 5, an exposure compensation value is set, the indicating needle 32c on the exposure compensation display 32 is rotated by a stepping motor (not shown) according to the direction and amount of rotation of the command dial 7, and the set exposure compensation value is displayed on the scale 32a. When the half-press switch 19 is turned ON during autofocus mode, the rangefinding device 13 detects the distance to the subject, and a stepping motor (not shown) rotates indicating needle 33c on the range display 33 in response to the detected distance. The pointer end 33d on one side of indicating needle 33c indicates the subject distance on scale 33a in meters (m). In the display example shown in FIG. 4, a subject distance of 3 m is indicated by pointer end 33d. When half-press switch 19 is turned OFF, the timing unit 16 (hereinafter referred to as "half-press timer") operates for a predetermined period of time (for example, three seconds), and indicating needle 33c holds for the predetermined period of time at the position it was in immediately before the half-press switch 19 was turned OFF. After the predetermined period of time has elapsed, the indicating needle 33c returns to the origin AF. In manual focus mode, when the command dial 7 is rotated while pressing the manual focus mode button 4 a desired range value is set, and indicating needle 33c is rotated according to the direction and amount of rotation of the command dial 7.

When the half-press switch 19 is turned ON during program mode, the photometric unit 26 detects a photometric value, and an aperture value is automatically determined according to a program which has been set in advance. A stepping motor (not shown) rotates needle 34c to display the aperture value on the aperture display 34 according to the determined aperture value. At this time, pointer end 34d on one side of indicating needle 34c indicates an aperture value on display scale 34a. In the display example in shown FIG. 4, a photometric value of F5.6 is indicated by pointer end 34d. After the half-press switch 19 is turned OFF, the half-press timer 16 operates for a predetermined period of time, and indicating needle 34c holds for the predetermined period of time at the position it was in immediately before the half-press switch 19 was turned OFF. After the predetermined period of time has elapsed, the indicating needle 34c returns to the origin P.

Figure 5:
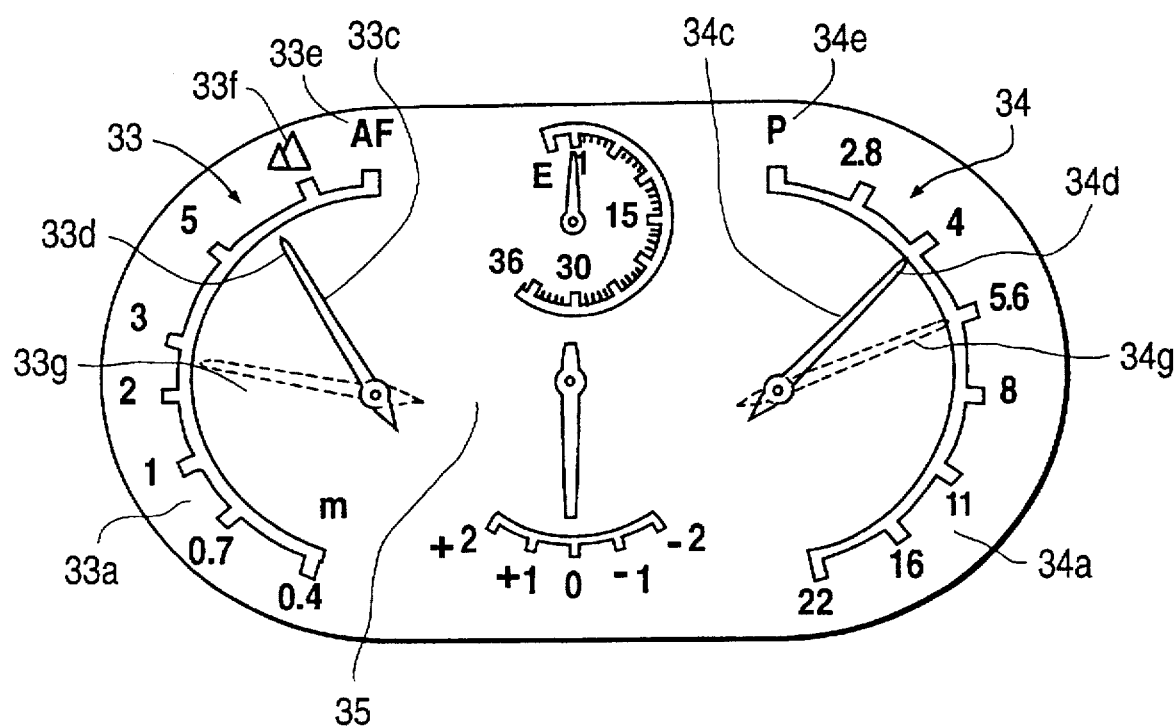
FIG. 5 is an enlarged top-view of a display showing operation of the display when new measurements of photographic data are performed during an indicating needle hold period.

FIG. 5 is an enlarged top-view of the display 3 showing an example of operation of the display 3 when new measurements are performed during the half-press timer period. First, when the half-press switch 19 is turned ON, rangefinding and photometry are performed, and the range and aperture values are displayed on the display 3. Next, when the half-press switch 19 is turned OFF, the half-press timer is actuated, and for a predetermined period of time determined by the half-press timer 16 indicating needles 33c and 34c are held at the respective positions they were in immediately before the half-press switch 19 was turned OFF. Indicating needles 33g and 34g, shown by the dotted lines in FIG. 5, indicate the positions during this hold period. When the half-press switch 19 is again turned ON during the half-press timer period, rangefinding and photometry are performed again, and indicating needles 33c and 34c move directly to their new positions indicating the presently measured values (shown with solid lines in FIG. 5) without returning to their respective origins AF and P. In particular, indicating needle 33c moves from 3 m, to which it had previously been pointing, to 8 m (between indexes 5 and 33f), and indicating needle 34c moves from 5.6, to which it had been pointing, to 4. When the half-press switch 19 is pressed while the indicating needles are moving, the movement of the respective indicating needles stops for the instant when the half-press switch 19 is pressed, then continues to the new positions. The indicating needles 33c and 34c do not return to the origins in this case either. Instead, when the half-press switch 19 is pressed while the indicating needles are moving, the positions at which the indicating needles have temporarily stopped are stored in the storage unit 23.

Figure 6:
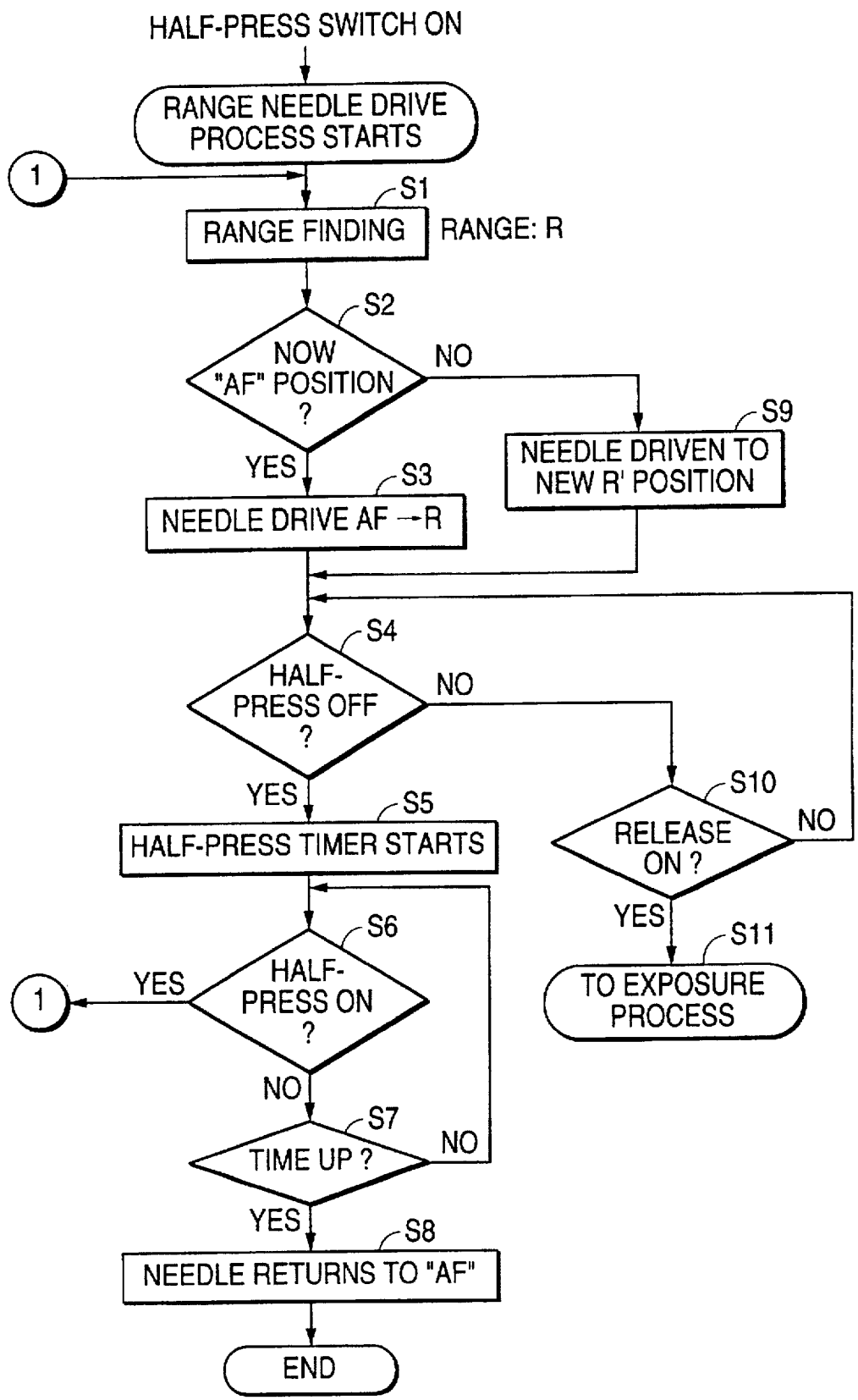
FIG. 6 is a flow chart showing an operational process for driving a range indicating needle in a display using the control system shown in FIG. 1.

Referring now to FIG. 6, the operational process for driving range indicating needle 33c during autofocus mode will be described. The process of driving range indicating needle 33c starts when the half-press switch 19 is turned ON. First, rangefinding is performed by the rangefinding device 13 and a range value R to a subject is measured (step S1). Next, it is determined whether indicating needle 33c is at the origin AF (step S2). If indicating needle 33c is at the AF position, the indicating needle 33c is driven (step S3) from the origin AF to a position corresponding to the measured range value R (3 m, in FIG. 4). It is then determined (step S4) whether the half-press switch 19 is OFF. If the half-press switch 19 is OFF, the half-press timer (which is set to, e.g., three seconds) is started (step S5), and it is determined whether the half-press switch 19 is ON (step S6). If the half-press switch 19 is not ON, it is determined (step S7) whether the half-press timer 16 has timed out. If the half-press timer 16 has timed out, the indicating needle 33c returns (step S8) from the range value R, to which it had been pointing, to the origin AF simultaneously with the timing out of the timer. The steps S4, S5, S6, S7 and S8 shown in the flow chart of FIG. 6 function to hold the range indicating needle 33c at its present position until the half-press timer 16 times out.

When indicating needle 33c is not at the origin AF (step S2), the indicating needle 33c is driven (step S9) directly from the range value R, to which it had previously been pointing, to a new range value R'. When the half-press switch 19 is not OFF in step S4, it is then determined whether the release switch 20 is ON (step S10). If the release switch 20 is ON, an exposure process takes place and the film is exposed (step S11). However, when the release switch 20 is not ON in step S10, it is again determined whether the half-press switch is OFF (step S4), and if the half-press switch 19 is OFF in step S4, the half-press timer 16 is started (step S5). When the half-press switch 19 is ON in step S6, rangefinding (step S1) is performed again. However, if the half-press switch 19 is OFF (step S6) and the half-press timer 16 has not timed out (step S7), it is again determined whether the half-press switch 19 is ON (step S6). The steps S2, S9 and S4 in the flow chart of FIG. 6 operate as an update command for the indicating needle 33c. Specifically, when the half-press switch 19 is turned ON again during the half-press timer period, indicating needle 33c moves directly from the range value to which it had been pointing to a new range value without returning to the origin AF, thereby updating the displayed value.

Figure 7:
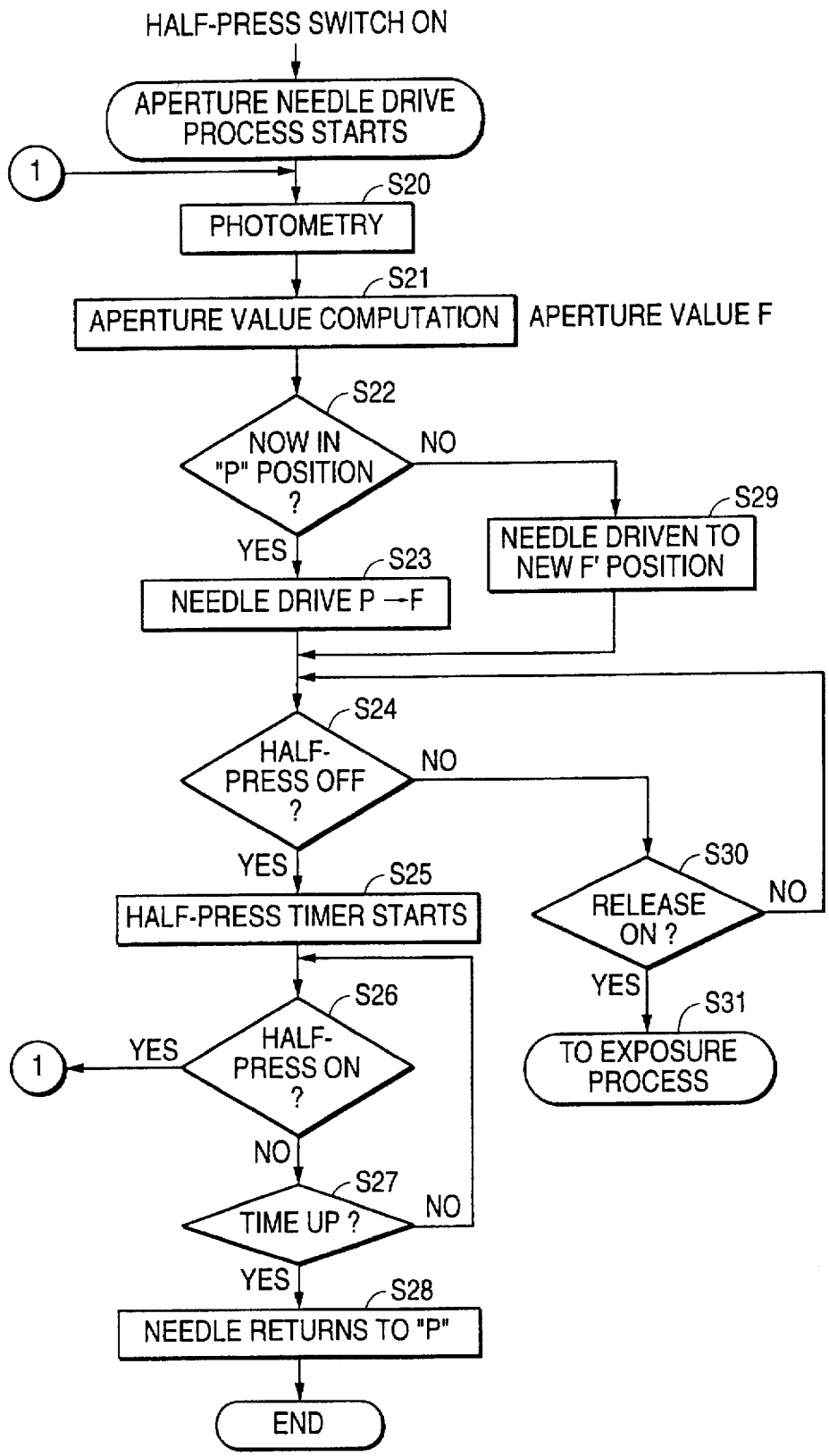
FIG. 7 is a flow chart showing an operational process for driving an aperture indicating needle in a display using the control system shown in FIG. 1.

Referring now to FIG. 7, the operational process for driving aperture indicating needle 34c during program mode will be described. It is noted that the processes described with respect to FIG. 6 and FIG. 7 are performed in parallel. The process of driving indicating needle 34c starts when the half-press switch 19 is turned ON. First, photometry of a photographic image plane is performed by the photometric unit 26 (step S20) to measure a photometric value, and an aperture value F is computed according to the photometric value using a program which has been set in advance. Next, it is determined whether indicating needle 34c is at the origin P (step S22). If the indicating needle 34c is at the P position, the indicating needle 34c is driven (step S23) from the origin P to a position corresponding to the computed value F (5.6, in FIG. 4). It is then determined (step S24) whether the half-press switch 19 is OFF. If the half-press switch 19 is OFF, the half-press timer (which is set to, e.g., three seconds) is started (step S25) and it is determined whether the half-press switch 19 is ON (step S26). If the half-press switch 19 is not ON, it is determined (step S27) whether the half-press timer 16 has timed out. If the half-press timer 16 has timed out, the indicating needle 34c returns (step S28) from the aperture value F, to which it had been pointing, to the origin P simultaneously with the timing out of the half-press timer 16. The steps S24, S25, S26, S27 and S28 function to hold the indicating needle 34c at its present position until the half-press timer 16 times out.

When indicating needle 34c is not at the origin P (step S22), the indicating needle 34c is driven directly (step S29) from the aperture value F, to which it had previously been pointing, to the new aperture value F'. Next, it is determined whether the half-press switch is OFF (step S24). When the half-press switch 19 is not OFF (step S24), it is then determined whether release switch 20 is ON (step S30). If the release switch 20 is ON, an exposure process is performed and the film is exposed (step S31). However, when the release switch 20 is not ON in step S30, it is again determined whether the half-press switch 19 is OFF (step S24), and if the half-press switch is OFF in step S24, the half-press timer is started (step S25). When the half-press switch 19 is ON in step S26, photometry is performed again (step S20). However, if the half-press timer 16 has not timed out (step S27), it is again determined whether half-press switch 19 is on (step S26). The steps S22, S29 and S24 operate as an update command for the indicating needle 34c. Specifically, when the half-press switch 19 is turned ON again during the half-press timer period, indicating needle 34c moves directly from the aperture value to which it had been pointing to a new aperture value without returning to the origin P.

As described above with reference to FIGS. 6 and 7, when new measurement of photographic data is performed during an indicating needle hold period, the respective indicating needles move directly from the positions to which they had been pointing to new positions without returning to the origins. As a result, the time needed for the indicating needles to rotate is reduced, the next photograph can be handled more quickly, and shutter chances will not be missed. Further, the indicating needles do not oscillate greatly, and as a result the display has little flicker and is easy to read.

Although the present invention has been described as having display indicating needles which are rotated, the present invention is not limited to rotational movement of the indicating needles, and, for example, linear movement is also possible.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A camera display device having an indicating needle for displaying photographic data, comprising:

a switch having a first position and a second position;

a measuring device to measure photographic data when the switch is in the first position;

a display to display the photographic data measured by the measuring device according to an amount the indicating needle moves from an origin position;

a hold command unit, operating when the switch switches from the first position to the second position, to hold the indicating needle at a present display position indicating the measured photographic data for a predetermined period of time, and to return the indicating needle to the origin after the predetermined period of time; and an update command unit, to move the indicating needle directly from the present display position to a new display position when the switch switches from the second position to the first position during the hold period and a new measurement of photographic data is performed.

2. A camera display device as recited in claim 1, further comprising a timer, operatively coupled to the hold command unit, to time the predetermined period of time after the switch switches from the first position to the second position.

3. A camera display device as recited in claim 2, wherein the timer starts when the switch switches from the first position to the second position, and the measuring device performs the new measurement of photographic data when the switch switches from the second position to the first position before the timer times out.

4. A camera display device, comprising:

a switch having an ON position and an OFF position;

a measuring device to measure photographic data when the switch is in the ON position;

a display, including an indicating needle and a display scale, to display photographic data measured by the measuring device according to a position pointed to by the indicating needle on the display scale;

a timer to time a predetermined period of time, starting when the switch switches from the ON position to the OFF position and ending when the timer times out;

a hold command unit, operating when the switch switches from the ON position to the OFF position, to control the indicating needle to hold at a first display position for the predetermined period of time, and to control the indicating needle to return to an origin position after the predetermined period of time; and an update command unit, to control the indicating needle to move directly from the first display position to a second display position when the switch is switched ON during the hold period and a new measurement of photographic data is performed.

5. A camera display device as recited in claim 4, wherein the measuring device measures photometric data and range data.

6. A camera display device as recited in claim 4, wherein the indicating needle rotates.

7. A camera display device as recited in claim 4, wherein the display includes a plurality of indicating needles and corresponding display scales, the measuring device measures a plurality of photographic data, and the hold command unit and the update command unit operate to hold and update, respectively, the positions of the respective indicating needles.

8. A camera display device as recited in claim 4, wherein the measuring device measures at least two different types of data, the display includes at least two indicating needles and corresponding display scales displaying the at least two different types of measured data, and the hold command unit and update command unit operate in parallel to hold and update, respectively, the at least two indicating needles.

9. A display device comprising:

a measuring device to measure data;

a display including an indicating needle and a display scale, the indicating needle pointing to the display scale to display data measured by the measuring device; and a control unit, operatively coupled to the measuring device and to the display, to control the indicating needle to display first measured data in response to a first measurement of data by the measuring device, to hold the indicating needle at a position displaying the first measured data for a predetermined period of time and to control the indicating needle to move directly from the position displaying the first measured data to a position displaying second measured data in response to a second measurement of data by the measuring device when the indicating needle is at the position displaying the first measured data.

10. A display device as recited in claim 9, wherein the control unit returns the indicating needle to an origin position after the hold period when the second measurement is not performed during the hold period.

11. A display device as recited in claim 10, further comprising:

a switch, operatively coupled to the measuring device and to the control unit, having a first position and a second position, wherein the measuring device measures the first measured data when the switch is in the first position and the control unit moves the indicating needle to point to a position on the display scale corresponding to the first measured data, and when the switch switches from the first position to the second position the control unit holds the indicating needle at the first display position for the predetermined period of time and then returns the indicating needle to the origin.

12. A display device as recited in claim 11, wherein the control unit controls the indicating needle to move directly to the position displaying second measured data when the switch switches from the second position to the first position during the hold period.

13. A method for controlling a display of data on a display having an indicating needle pointing to positions on a display scale to display data, comprising:

measuring first data and moving the indicating needle to a first display position displaying the measured first data;

holding the indicating needle at the first display position for a predetermined period of time;

measuring second data; and moving the indicating needle directly from the first display position to a second display position displaying the measured second data when the step of measuring second data occurs during the predetermined period of time during which the indicating needle is held at the first display position.

14. A method for controlling a display as recited in claim 12, wherein the step of measuring first data comprises:

detecting a switch in a first switch position;

measuring the first data in response to the switch being in the first switch position, and moving the indicating needle to the first display position to display the first data; and the step of measuring second data comprises detecting the switch in a second position, and measuring the second data when the switch switches from the second switch position to the first switch position while holding the indicating needle at the first display position.

* * * * *